(12) United States Patent
Shiu et al.

(10) Patent No.: US 8,464,609 B2
(45) Date of Patent: Jun. 18, 2013

(54) CONVERTIBLE, PUSH-BICYCLE FOR A CHILD

(75) Inventors: Brian Kinting Shiu, Sunnyvale, CA (US); Vanessa Chen-Hwa Shiu, Sunnyvale, CA (US)

(73) Assignee: Kroozn, LLC, Sunnyvale, CA (US)

( * ) Notice: Subject to any disclaimer, the term of this patent is extended or adjusted under 35 U.S.C. 154(b) by 974 days.

(21) Appl. No.: 12/363,463

(22) Filed: Jan. 30, 2009

(65) Prior Publication Data
US 2010/0192722 A1 Aug. 5, 2010

(51) Int. Cl.
*B62M 3/08* (2006.01)
*B62K 15/00* (2006.01)

(52) U.S. Cl.
USPC .......... 74/594.7; 74/594.1; 280/278; 280/287

(58) Field of Classification Search
USPC .................. 74/594.1, 594.2, 594.7; 280/278, 280/287, 7.15; 440/26, 27, 30
IPC ................................................ B62M 3/00,3/08
See application file for complete search history.

(56) References Cited

U.S. PATENT DOCUMENTS

| | | | |
|---|---|---|---|
| 567,161 A * | 9/1896 | Le Grand Peirce | 74/594.7 |
| 652,988 A * | 7/1900 | Wells | 74/594.7 |
| 1,276,139 A | 8/1918 | Warren | |
| 2,384,139 A | 9/1945 | Schwinn | |
| 3,303,720 A | 2/1967 | Jaulmes | |
| 3,746,367 A | 7/1973 | Johannsen | |
| 3,862,725 A | 1/1975 | Gename | |
| 4,422,663 A * | 12/1983 | Hon | 280/278 |
| 4,429,890 A * | 2/1984 | Hon | 280/259 |
| 4,507,105 A | 3/1985 | Stottmann et al. | |
| 4,842,292 A * | 6/1989 | Wang | 280/287 |
| 4,887,827 A | 12/1989 | Heggie | |
| 5,273,300 A * | 12/1993 | Wells | 280/259 |
| 5,314,207 A | 5/1994 | Camfield et al. | |
| 6,003,890 A | 12/1999 | Inouye | |
| 6,425,598 B2 * | 7/2002 | Murayama | 280/278 |
| 6,568,038 B2 | 5/2003 | Patelli et al. | |
| 6,581,494 B2 | 6/2003 | Sechler | |
| 6,637,292 B2 | 10/2003 | Chu | |
| 6,769,708 B2 | 8/2004 | Ackerly | |
| 6,968,754 B2 * | 11/2005 | Bandarra | 74/594.7 |

(Continued)

OTHER PUBLICATIONS

Amazon.com, Playskool Glide to Ride Bike Girl, [online] [retrieved on Aug. 13, 2010] URL: http://www.amazon.com/Playskool-Glide-Ride-Bike-Girl/dp/B00196VBIO.

(Continued)

*Primary Examiner* — Richard Ridley
*Assistant Examiner* — Thomas Diaz
(74) *Attorney, Agent, or Firm* — Syndicated Law; Brian S. Boyer

(57) ABSTRACT

An articulable crankset for converting a pedal-powered vehicle into a push-powered vehicle is provided. The articulable crankset can be in a retracted position to provide at least less of an obstruction to a user's legs during use of the push-powered vehicle than a non-retractable crankset. The vehicle can be a bicycle, and the articulable crankset can be a component of a production bicycle or a component of a conversion kit that will convert a bicycle from a pedal-powered bicycle to a convertible bicycle that can also function as a push-powered bicycle.

9 Claims, 8 Drawing Sheets

U.S. PATENT DOCUMENTS

| | | | |
|---|---|---|---|
| 7,097,597 B2 | 8/2006 | Tamian | |
| 7,228,761 B1 | 6/2007 | Chen | |
| 7,288,048 B2 | 10/2007 | Lin | |
| 2001/0023211 A1* | 9/2001 | Bowman | 474/146 |
| 2003/0094072 A1 | 5/2003 | Chen | |
| 2006/0232040 A1 | 10/2006 | Franco | |

OTHER PUBLICATIONS

BOSSBi, BMW kid's bike, [online] [retrieved on Aug. 13, 2010] URL: http://www.bossbi.com/bike/bmw/bmwbikes.php.

Sheldon Brown, Cottered Cranks, [online] [retrieved on Aug. 13, 2010] URL: http://www.sheldonbrown.com/cotters.html.

Road CC, Original Dahon-that folding crank, [online] [retrieved on Aug. 13, 2010] URL: http://road.cc/content/original-dahon-folding-crank.

Skuut, [online] [retrieved on Aug. 13, 2010] URL: http://www.skuut.com/.

* cited by examiner

199 CONVERSION ADAPTERS

CONVERTIBLE, PUSH-BICYCLE FOR A CHILD

BACKGROUND

1. Field of the Invention

The teachings provided herein relate to an articulable crankset for converting a pedal-powered vehicle into a push-powered vehicle having the articulable crankset in a retracted position to provide at least less of an obstruction to a user's legs during use of the push-powered vehicle than a non-retractable crankset.

2. Description of Related Art

Most everyone has experienced learning how to ride a bicycle as well as witnessed watching, or even teaching, a child how to ride a bicycle. During the process of learning how to ride a bicycle, one of the goals is to reduce or eliminate fear, hesitancy, or rejection of biking. Training wheels have been used as the standard accessory for many years for teaching children how to ride a bicycle, and they continue to present problems that are all too familiar. For example, training wheel modified bicycles wobble from side to side and make the child feel unstable; and, the child is often positioned so uncomfortably high in the air that the child has difficulty touching the ground. Of course, one or a combination of these problems can create a situation that is quite terrifying to a child that is afraid to fall or that has fallen and doesn't want to get hurt again. In addition, training wheel modified bicycles teach a child how to steer and pedal but, unfortunately, the child does not learn how to balance. As such, the transition from a training wheel bicycle to a bicycle without training wheels can be daunting for anyone, since the sensation of balancing remains new and unfamiliar, and the fear of falling can be intense. Moreover, the parent teaching the child how to ride the bicycle usually will need to run alongside the bicycle to help prevent an injury to the child. Although this may be somewhat inconvenient for younger, active parents, this can be quite troublesome and difficult for less active parents, older parents, and grandparents. It may even be impossible. Tricycles aren't a good answer to the problem, because tricycles are unstable and susceptible to tipping over due to the instability that is inherent to the three-wheel structure. Also, tricycles aren't "a real bicycle" in the eyes of a child, and the child riding the tricycle does not learn the balancing that is required for the safe operation of a bicycle.

There are "push-bicycles" and "running bicycles" available on the market but these bicycles are either (i) not convertible from a pedal-powered bicycle to a push-bicycle, or (ii) do not leave the drive mechanism intact during the conversion, making the conversion inconvenient and difficult to perform, particularly when the user is in the process of using the bicycle. Some of these bicycles are made almost entirely out of wood, such as the Skuut Balance Bicycle, and are not capable of conversion to a pedal-powered bicycle. See ww.skuut.com. As such, in order to have a pedal-powered bicycle, another bicycle must be purchased. There is also the BMW Kids Bicycle, which is convertible into a push-bicycle, but the drive mechanism does not remain intact. See http://www.bossbi.com/bicycle/bmw/bmwbicycles.php. In addition, these bicycles can also have abrupt and discontinuous surfaces exposed to a child's legs, causing discomfort and possible injury to the child's legs, even after removal of the cranks or crankset.

One of skill in the art will appreciate an articulable crankset that enables a bicycle to be quickly and easily converted from a pedal-powered bicycle to a push-powered bicycle while keeping the entire drive mechanism intact. A bicycle that is produced and sold as a new bicycle having this functionality will be appreciated, as will the availability of a conversion kit for existing bicycles to provide this functionality to a. One of skill will also appreciate the availability of a housing for a crankset that is designed to protect a child's legs from the abrupt and discontinuous surfaces on bicycles, as well as a steering limiter that would add to the safety of the user of the convertible bicycle.

SUMMARY

The teachings provided herein relate to an articulable crankset for converting a pedal-powered vehicle into a push-powered vehicle having the articulable crankset in a retracted position to provide at least less of an obstruction to a user's legs during use of the push-powered vehicle than a non-retractable crankset.

In some embodiments, the teachings are directed to an articulable crankset for a convertible, pedal-powered vehicle comprising a spindle, a first crankarm, and a second crankarm. The spindle has a central axis, a first end, and a second end; wherein, the spindle is adapted to rotatably attach to a pedal-powered vehicle to enable a user to pedal the pedal-powered vehicle. The first crankarm has a central axis, a spindle end, and a pedal end, wherein the first end of the spindle articulably attaches to the spindle end of the first crankarm, and the pedal end of the first crankarm is adapted to articulably attach to a first pedal. Likewise, the second crankarm has a central axis, a spindle end, and a pedal end, wherein the second end of the spindle articulably attaches to the spindle end of the second crankarm, and the pedal end of the second crankarm is adapted to articulably attach to a second pedal.

The central axis of the first crankarm at least substantially shares a first plane with the central axis of the spindle, wherein the first crankarm is adapted to (i) articulate with the spindle up to at least about 180 degrees at least substantially on the first plane and (ii) articulate with the first pedal up to at least about 90 degrees at least substantially on the first plane. Likewise, the central axis of the second crankarm at least substantially shares a second plane with the central axis of the spindle, the second plane optionally at least substantially coincident with the first plane, and the second crankarm is adapted to (i) articulate with the spindle up to at least about 180 degrees at least substantially on the second plane and (ii) articulate with the second pedal at least about 90 degrees at least substantially on the second plane. The crankset is articulable from a pedaling position to a retracted position to convert the pedal-powered vehicle to a push-powered vehicle having crankarms and pedals positioned to provide at least less of an obstruction to a user's legs during use of the push-powered vehicle than a non-retractable crankset.

In some embodiments, the retracted position is a backward position in which the first pedal and the second pedal are retracted toward the rear of the pedal-powered vehicle. In some embodiments, the retracted position is a forward position in which the first pedal is positioned at least substantially normal to the central axis of the first crankarm, the second pedal is positioned at least substantially normal to the central axis of the second crankarm, and the first pedal and the second pedal function as a platform for a user's feet during use of the pedal-powered vehicle.

In some embodiments, the spindle end of the first crankarm or the spindle end of the second crankarm articulably attaches to its respective spindle end through a clevis joint. Likewise, in some embodiments, the pedal end of the first crankarm or the pedal end of the second crankarm articulably attaches to its respective pedal through a clevis joint. Moreover, in some embodiments, the pedal end of the first crankarm or the pedal end of the second crankarm articulably attaches to its respective pedal through a pedal coupling.

The teachings are also directed to an articulable crankset for a convertible, pedal-powered vehicle. The crankset comprises a spindle having first end, a second end, and a central axis. The first end of the spindle is attached to a spindle end of a first crankarm having a first central axis. Likewise, the second end of the spindle is attached to a spindle end of a second crankarm having a second central axis. The first central axis at least substantially shares a first plane with the central axis of the spindle, and the second central axis at least substantially shares a second plane with the central axis of the spindle. Moreover, the first plane and second plane are optionally coincident.

The first crankarm or the second crankarm articulably attaches to the spindle. And, the central axis of the first crankarm or the second crankarm articulates up to at least about 180 degrees with the central axis of the spindle at least substantially on the first plane or second plane, respectively. The first crankarm has a first pedal end adapted for attaching to a first pedal, and the second crankarm has a second pedal end adapted for attaching to a second pedal. The first pedal or the second pedal articulates at least about 90 degrees with its respective pedal end to reversibly articulate the crankset from a pedaling position to a retracted position to convert the vehicle from a pedal-powered vehicle to a push-powered vehicle. The push-powered vehicle has crankarms and pedals positioned to provide at least less of an obstruction to a user's legs during use of the push-powered vehicle than a non-retractable crankset.

In some embodiments, the retracted position is a backward position in which the first pedal and the second pedal are retracted toward the rear of the pedal-powered vehicle. And, in some embodiments, the retracted position is a forward position which the first pedal is positioned at least substantially normal to the central axis of the first crankarm, and the second pedal is positioned at least substantially normal to the central axis of the second crankarm. The first pedal and the second pedal can function as a platform for a user's feet during use of the pedal-powered vehicle.

In some embodiments, the spindle end of the first crankarm or the spindle end of the second crankarm articulably attaches to its respective spindle end through a clevis joint. And, in some embodiments, the pedal end of the first crankarm or the pedal end of the second crankarm articulably attaches to its respective pedal through a clevis joint. Moreover, in some embodiments, the pedal end of the first crankarm or the pedal end of the second crankarm articulably attaches to its respective pedal through a pedal coupling.

The teachings are also directed to a bicycle comprising a drive mechanism that includes an articulable crankset described above. In some embodiments, the bicycle can further comprise handlebars having a rotation that is limited by a steering limiter, wherein the steering limiter limits the rotation of the handlebars to substantially less than about 180 degrees. In some embodiments, the bicycle can further comprise a housing for containing the retractable crankset, wherein the housing comprises an outer surface that shields the user from the articulable crankset in the retracted position and does not obstruct rotation of the crankset when the articulable crankset is in the pedaling position. In some embodiments, the housing further protects the user from at least a portion of the drive mechanism.

The teachings are also directed to a bicycle comprising a drive mechanism that includes a collapsible crankset. The collapsible crankset has a spindle connected at each end to one of two crankarms. At least one of the crankarms articulates with the spindle up to at least about 180 degrees through a clevis joint. The articulation of the crankarm retracts the crankset from (i) a pedaling position having the crank arms positioned at least substantially normal to the spindle in at least substantially opposing directions on opposite sides of the spindle to (ii) a collapsed position having the crank arms positioned at least substantially normal to the spindle in at least substantially the same direction on the same side of the spindle. The collapsible crankset can further comprise a collapsible pedal mechanism to further retract the crankset, wherein at least one of the pedals articulates with its respective crankarm from (i) a position that is at least substantially normal to the its respective crankarm to (ii) a position that is at least substantially parallel with the position of its respective crankarm.

One of skill will appreciate that each of the embodiments will apply to any size bicycle with any size or age range of rider. In some embodiments, the bicycle is a child's bicycle for use by a child rider and, in some embodiments, the bicycle is for use by an adult rider.

In some embodiments, the collapsed position is a backward position in which the two crankarms are retracted toward the rear of the bicycle. And, in some embodiments, the collapsed position is a forward position which the two crankarms are retracted toward the front of the bicycle, each crankarm having a pedal in a position that is at least substantially normal to the axis of its respective crankarm, wherein the pedals function as platforms for a user's feet during use of the bicycle.

In some embodiments, the bicycle can further comprise a housing for containing the collapsible crankset, wherein the housing comprises an outer surface that shields the user from the collapsible crankset in the collapsed position and does not obstruct rotation of the crankset when the collapsible crankset is in the pedaling position. In some embodiments, the housing further protects the user from the drive mechanism.

The bicycle can further comprising handlebars having a rotation that is limited by a steering limiter. The steering limiter limits the rotation of the handlebars to substantially less than about 180 degrees.

The teachings are also directed to a kit for converting a bicycle from a pedal-powered bicycle to a push-powered bicycle. The kit comprises an articulable crankset described above; conversion adapters to install the articulable crankset into a bicycle; and, instructions for assembling the articulable crankset into the bicycle and converting the bicycle from a pedal-powered bicycle to a convertible bicycle that can also function as a push-powered bicycle.

One of skill will appreciate that the concepts taught herein can extend into additional embodiments that go well-beyond a literal reading of the claims, the inventions recited by the claims, and the terms recited in the claims.

DETAILED DESCRIPTION

The teachings provided herein relate to an articulable crankset for converting a pedal-powered vehicle into a push-powered vehicle having the articulable crankset in a retracted position to provide at least less of an obstruction to a user's legs during use of the push-powered vehicle than a non-retractable crankset.

Figure 1A:
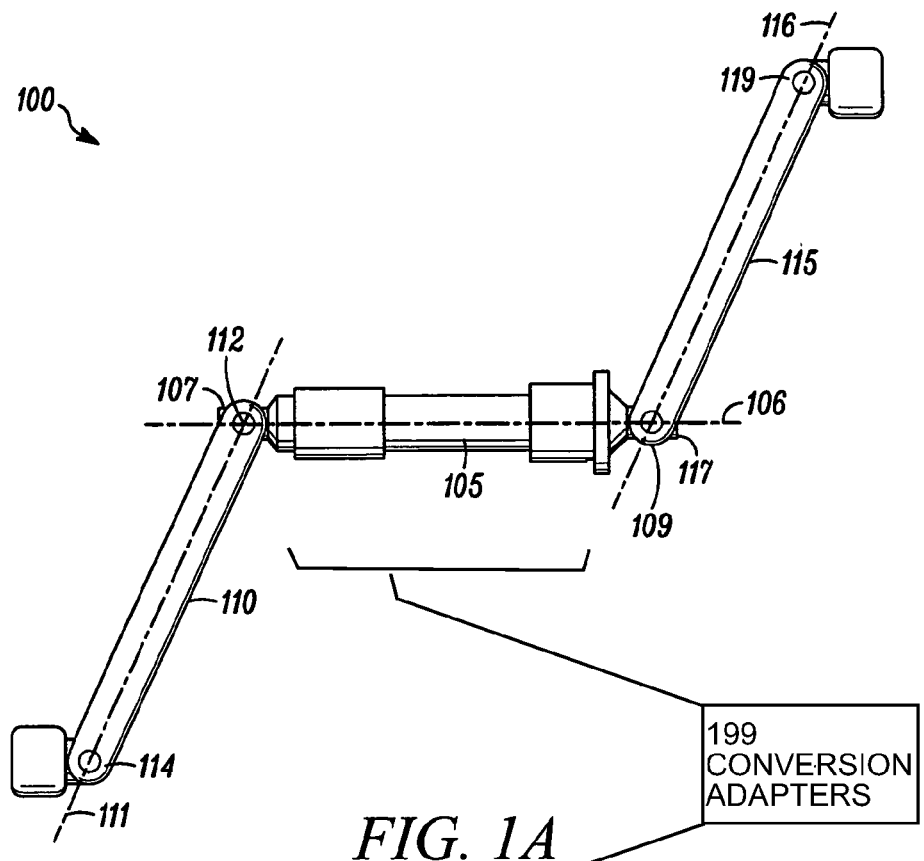
FIGS. 1A and 1B illustrate an articulable crankset in a position for pedaling and in a retracted position, according to some embodiments.
Figure 1B:
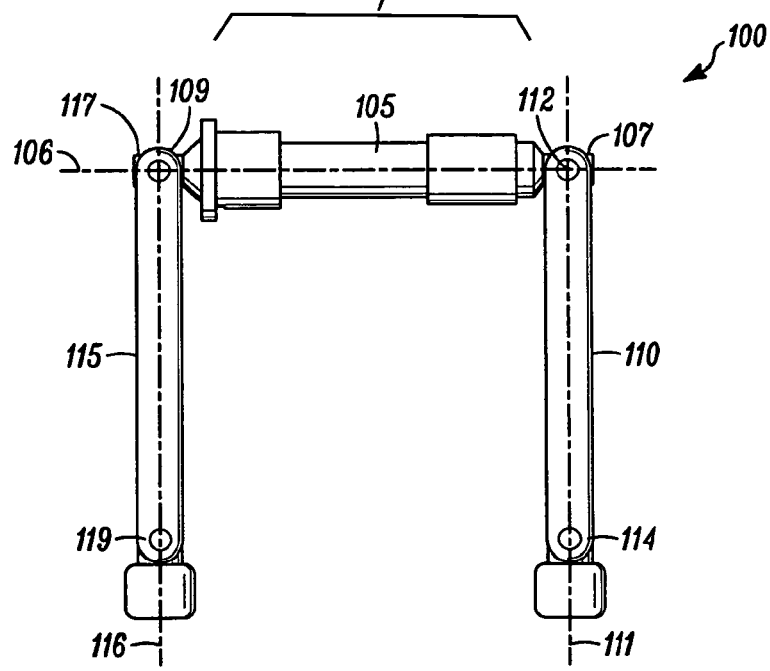

In some embodiments, the teachings are directed to an articulable crankset for a convertible, pedal-powered vehicle. FIGS. 1A and 1B illustrate an articulable crankset in a position for pedaling and in a retracted position, according to some embodiments. Since the crankset is articulable, the crankset can be releasably fixed in a variety of positions, where the choice of position is selected based on the user's preferred use of the vehicle. For example, the "position for pedaling" is a reversibly or releasably fixable position, such that the joints between the crankset components can be reversibly or releasably fixed in position using any method known in the art, such as by tightening a screw, for example. The joints can be reversed by releasing the fixed joint such as, for example, by loosening a screw in some embodiments. Any method known to one of skill for reversibly locking a mechanical joint can be used, such as by sliding a sleeve over a locking mechanism, using a spring-loaded set of splines that mate at the joint, using a male and female keying in the joint, or using any interlocking or friction mechanism that can be releasably or reversibly fastened to lock a joint in the crankset. A combination of the above features can also be used in the crankset, as would be appreciated by one of skill.

The crankset 100 comprises a spindle 105, a first crankarm 110, and a second crankarm 115. The spindle 105 has a central axis 106, a first end 107, and a second end 109; wherein, the spindle 105 is adapted to rotatably attach to a pedal-powered vehicle to enable a user to pedal the pedal-powered vehicle. A spindle 105 can be adapted to rotatably attach, for example, by positioning the spindle inside of a bracket that is fixed to a frame for the pedal-powered vehicle, wherein the spindle 105 rotates on its axis relative to the bracket to power the vehicle through a drive mechanism, such as a chain-sprocket assembly that connects the crankset to a drive wheel. One of skill will appreciate that a friction-reducing mechanism, such as a mechanism that includes bearings, can be used to reduce the friction between the spindle and the bracket during pedaling of the pedal-powered vehicle. A bicycle will typically have a "bottom bracket," a rigid tube that is welded to a low point on the bicycle frame and designed to accept a set of bearings, as well as the spindle 105, which rotates on its axis relative to the bracket. In some embodiments, the spindle 105 can compose a part of a "sealed bottom bracket assembly," such that the spindle 105, bearings, and even a lubricant, are a complete sealed unit that is ready for installation into the bicycle's bottom bracket.

The first crankarm 110 has a central axis 111, a spindle end 112, and a pedal end 114, wherein the first end 107 of the spindle 105 articulably attaches to the spindle end 112 of the first crankarm, and the pedal end 114 of the first crankarm is adapted to articulably attach to a first pedal (not shown). Likewise, the second crankarm 115 has a central axis 116, a spindle end 117, and a pedal end 119, wherein the second end 109 of the spindle 105 articulably attaches to the spindle end 117 of the second crankarm 115, and the pedal end 119 of the second crankarm 115 is adapted to articulably attach to a second pedal (not shown).

The phrase "articulably attach" refers to any mechanical joint that exists between components and allows motion between the components. A hinge joint allows for articulation, for example, and the hinge joint can be a clevis joint in some embodiments.

The central axis 111 of the first crankarm 110 at least substantially shares a first plane with the central axis 106 of the spindle 105, wherein the first crankarm 110 is adapted to (i) articulate with the spindle 105 up to at least about 180 degrees at least substantially on the first plane and (ii) articulate with the first pedal (not shown) up to at least about 90 degrees at least substantially on the first plane. Likewise, the central axis 116 of the second crankarm 115 at least substantially shares a second plane with the central axis 106 of the spindle 105, the second plane optionally at least substantially coincident with the first plane, and the second crankarm 115 is adapted to (i) articulate with the spindle 105 up to at least about 180 degrees at least substantially on the second plane and (ii) articulate with the second pedal (not shown) at least about 90 degrees at least substantially on the second plane. The crankset 100 is articulable from a pedaling position, an example of which is in FIG. 1A, to a retracted position, an example of which is in FIG. 1B, to convert the pedal-powered vehicle to a push-powered vehicle having crankarms 110,115 and pedals (not shown) positioned to provide at least less of an obstruction to a user's legs during use of the push-powered vehicle than a non-retractable crankset.

The phrase "at least substantially" refers to the concept that the axes, planes, and alignments of the components of the crankset will vary with functional design and aesthetic design. For all practical purposes, the position of the component or the movement of the component, generally happens in that space, on that plane, etc. Axes that at least substantially share a plane, for example, refer to axes that may only deviate from sharing the plane slightly due to slight modifications in component design and position that complement other parts of the vehicle in utility or design. For example, the central axis of a purely linear crank arm, for example, may share a plane with the central axis of the spindle, whereas the central axis of the same crank arm that has a slight bend to accommodate pedaling around a chainstay may have slightly different central axis that at least substantially shares a plane with the central axis of the spindle. The same is true for a movement that occurs at least substantially on a plane, or a plane that is at least substantially coincident with another plane, etc. Moreover, positions that are at least substantially equal can provide functions that are at least substantially equal.

Figure 2A:
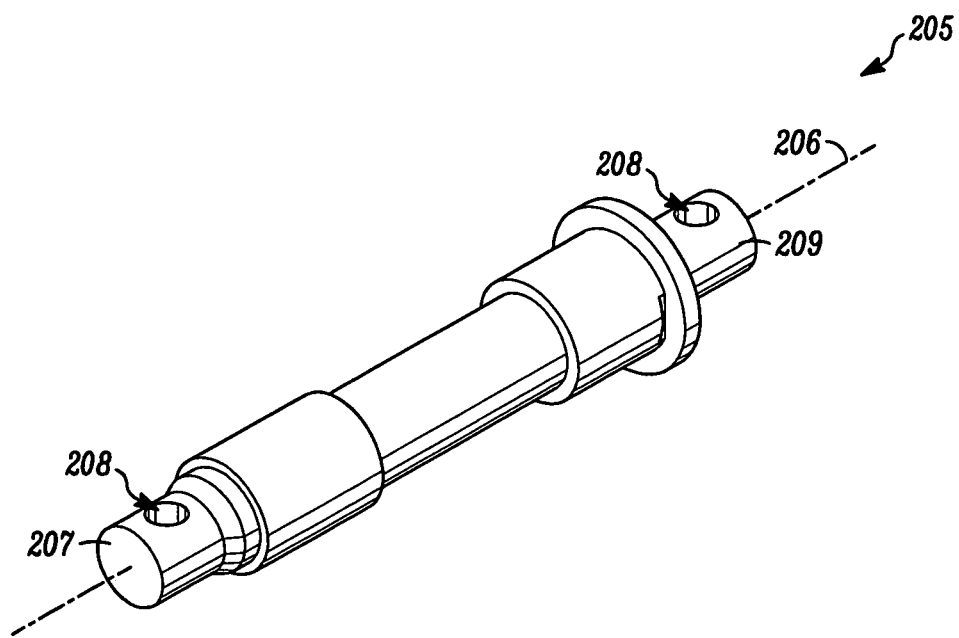
FIGS. 2A, 2B, and 2C illustrate a spindle, a crankarm, and a pedal coupling, according to some embodiments.
Figure 2B:
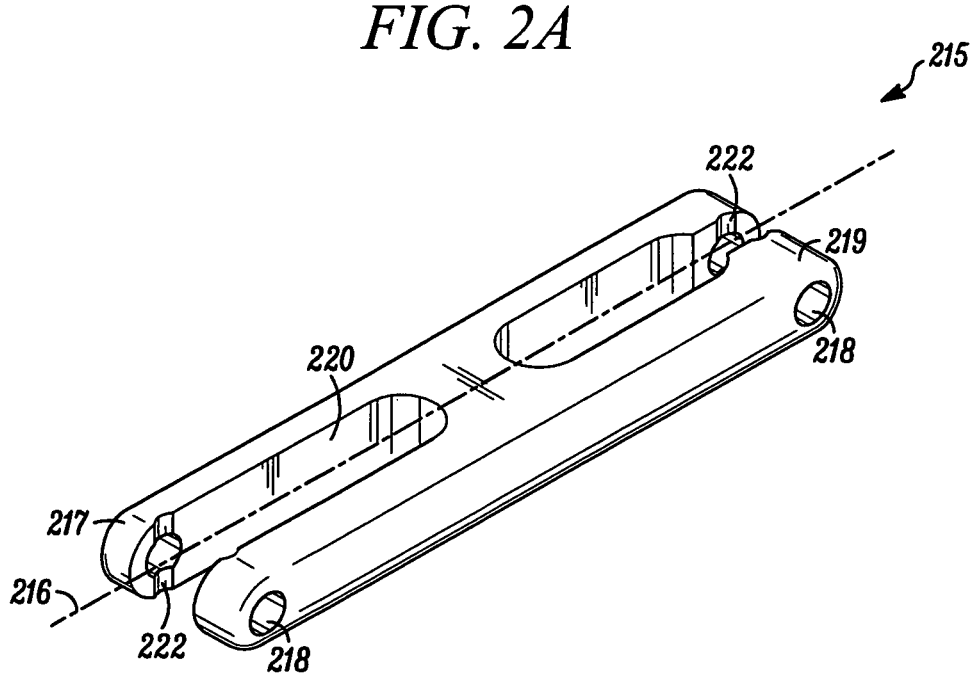
Figure 2C:
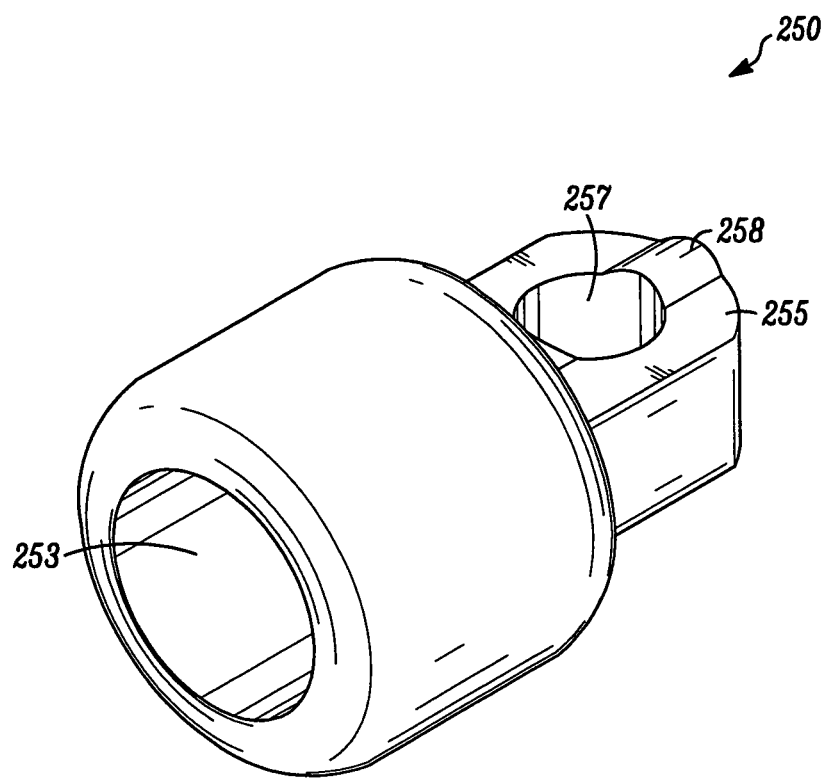

FIGS. 2A, 2B, and 2C illustrate a spindle, a crankarm, and a pedal coupling, according to some embodiments. FIG. 2A shows a spindle 205 having a central axis 206, a first end 207, and a second end 209. In this embodiment, the spindle 205 is adapted to have holes 208 for articulably attaching crankarms to the spindle 205. FIG. 2B shows a crankarm 215 having a central axis 216, a spindle end 217, and a pedal end 219. In this embodiment, the crankarm 215 is adapted to have holes 218 for articulably attaching the crankarm 214 to the spindle 205. Slots 220 are an extension of a clevis joint formed by the articulable attachment of the spindle 205 and the crankarm 215 and can be designed to reduce the weight of the crankarm while maintaining a desired amount of strength and flexibility when reversibly articulating the crankset. FIG. 2C shows a pedal coupling 250 that can be used to articulably attach a pedal to the crankarm 215 by threading the pedal into threaded end 253, wherein threaded end 253 can have a left-handed or right-hand thread. A clevis joint can be formed at the pedal attachment, for example, by articulably attaching coupling end 255 to the pedal end 219.

In some embodiments, the releasably or reversibly fixing of the articulable joints in the crank can comprise a restraining feature, such as a detent. An example of such a detent is the male keying 258 and the female keying 222 shown in FIGS. 2B and 2C. Other locking and friction mechanisms known to one of skill can be used to secure a desired position of the crankset at the articulable joints, such as the use of splines, teeth, a ratchet mechanism, or any friction or any interlocking mechanism that can be contemplated using concepts known to one of skill. The spindle 205, the crankarm 215, the pedal coupling 250, and the hardware used to assemble the crankset can each be produced using any suitable materials and methods known to one of skill in the art. In some embodiments, the spindle end of the first crankarm or the spindle end of the second crankarm articulably attaches to its respective spindle end through a clevis joint. Likewise, in some embodiments, the pedal end of the first crankarm or the pedal end of the second crankarm articulably attaches to its respective pedal through a clevis joint. Moreover, in some embodiments, the pedal end of the first crankarm or the pedal end of the second crankarm articulably attaches to its respective pedal through a pedal coupling.

Of course, the teachings are also directed to a bicycle comprising a drive mechanism that includes an articulable crankset described above. In some embodiments, the bicycle can further comprise a housing for containing the retractable crankset, wherein the housing comprises an outer surface that shields the user from the articulable crankset in the retracted position and does not obstruct rotation of the crankset when the articulable crankset is in the pedaling position. In some embodiments, the housing further protects the user from at least a portion of the drive mechanism.

Figure 3A:
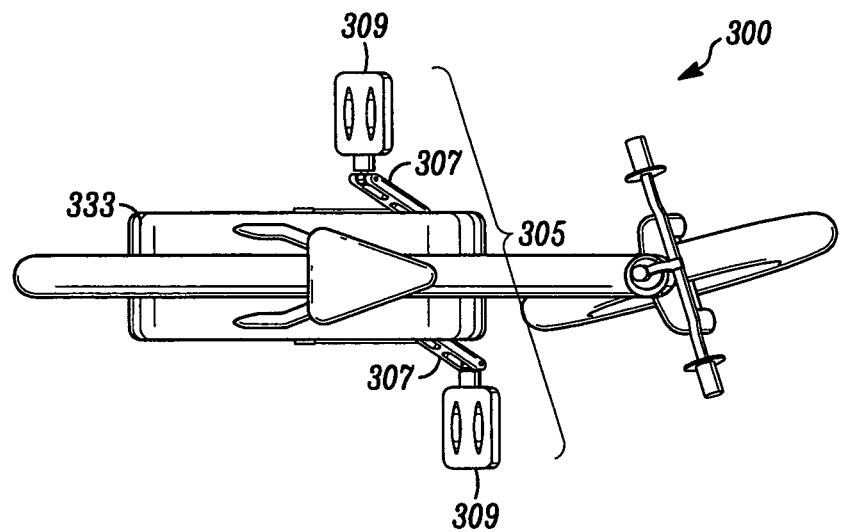
FIGS. 3A, 3B, and 3C illustrate a bicycle having a housing for an articulable crankset, wherein the crankset is in a position for use as a pedal-powered bicycle and in a position for use as a push-powered bicycle, according to some embodiments.
Figure 3B:
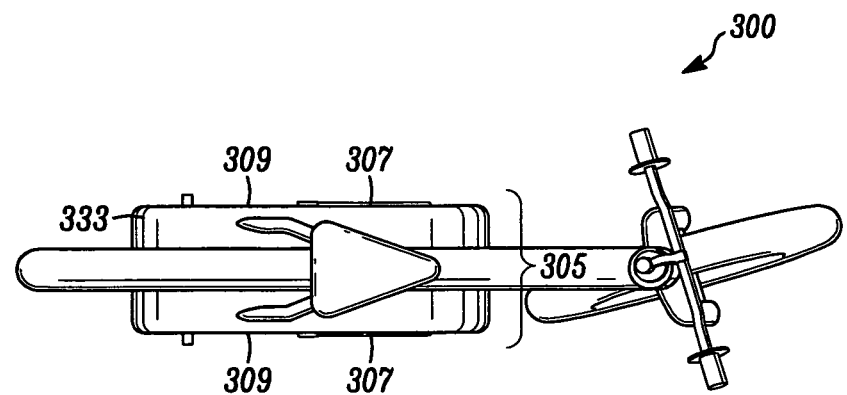
Figure 3C:
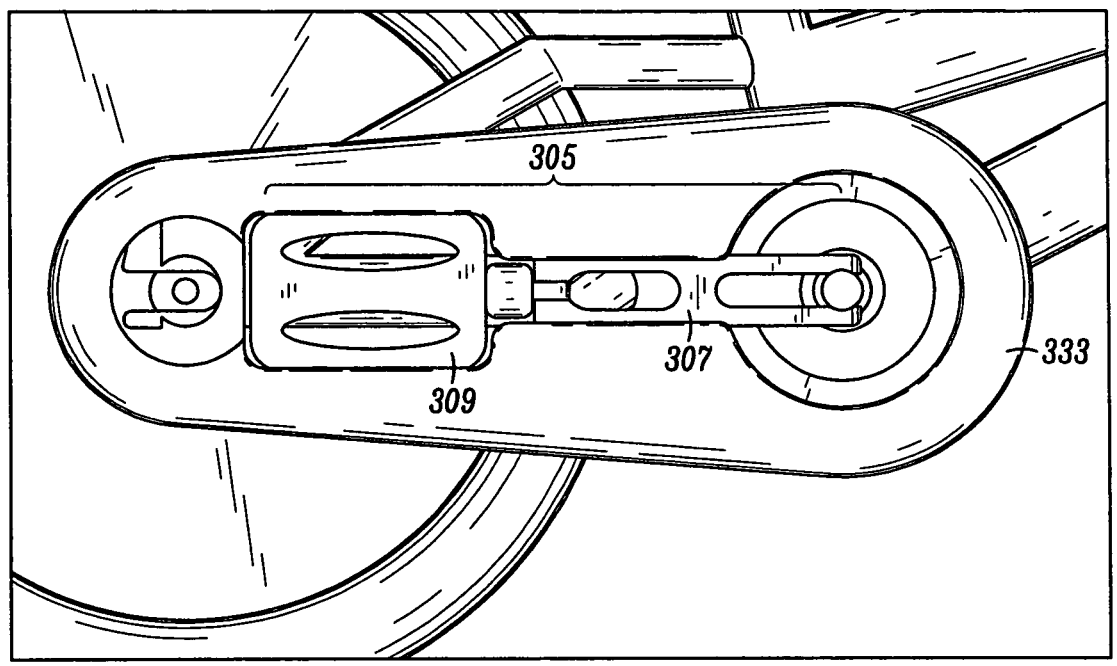

The articulable cranksets taught herein can be articulated into a variety of positions, essentially any position that may be desired by one of skill, for example, for use as a push-powered bicycle, or perhaps for use as a collapsible or retractable component of a fold-up bicycle for transport or storage. FIGS. 3A, 3B, and 3C illustrate a bicycle having a housing for an articulable crankset, wherein the crankset is in a position for use as a pedal-powered bicycle and in a position for use as a push-powered bicycle, according to some embodiments. FIG. 3A shows a top-view of the bicycle 300 having the retractable crankset 305 in a position for pedaling, wherein the position is retractable by articulating the crankarms 307 and pedals 309. FIG. 3B shows a top-view of the bicycle 300 having the articulable crankset 305 in a retracted position to convert the pedal-powered bicycle to a push-powered bicycle having the crankarms 307 and the pedals 309 positioned to provide at least less of an obstruction to a user's legs during use of the push-powered bicycle than a non-retractable crankset, and a side-view of the articulable crankset 305 in a retracted position, according to some embodiments.

Any of the pedal-powered vehicles taught herein can further comprise a housing for containing the retractable crankset, wherein the housing comprises an outer surface that shields the user from the retractable crankset in the collapsed position. In some embodiments, the housing further protects the user from the drive mechanism. FIG. 3C shows the articulable crankset 305 in a retracted position in which the housing 333 shields the user's legs from the collapsed crankarms 307 and collapsed pedals 309. In some embodiments, the housing 333 further comprises a mechanism for holding the retracted crankset in its retracted position. One of skill will appreciate that there are several known means to hold the crankset, and these means are generally fasteners, such as gates, screws, clips, straps, and the like, for securing the crankset; protuberances that can provide a pressure fit or a friction fit between the housing 333 and the crankset 305; or a simple molding design of the housing 333 that will allow for a tongue-and-groove type of assembly between the retracting crankset 305 and the housing, where the pedal 309 slides into a recess of the housing 333 during retraction of the crankset 305.

Figure 4:
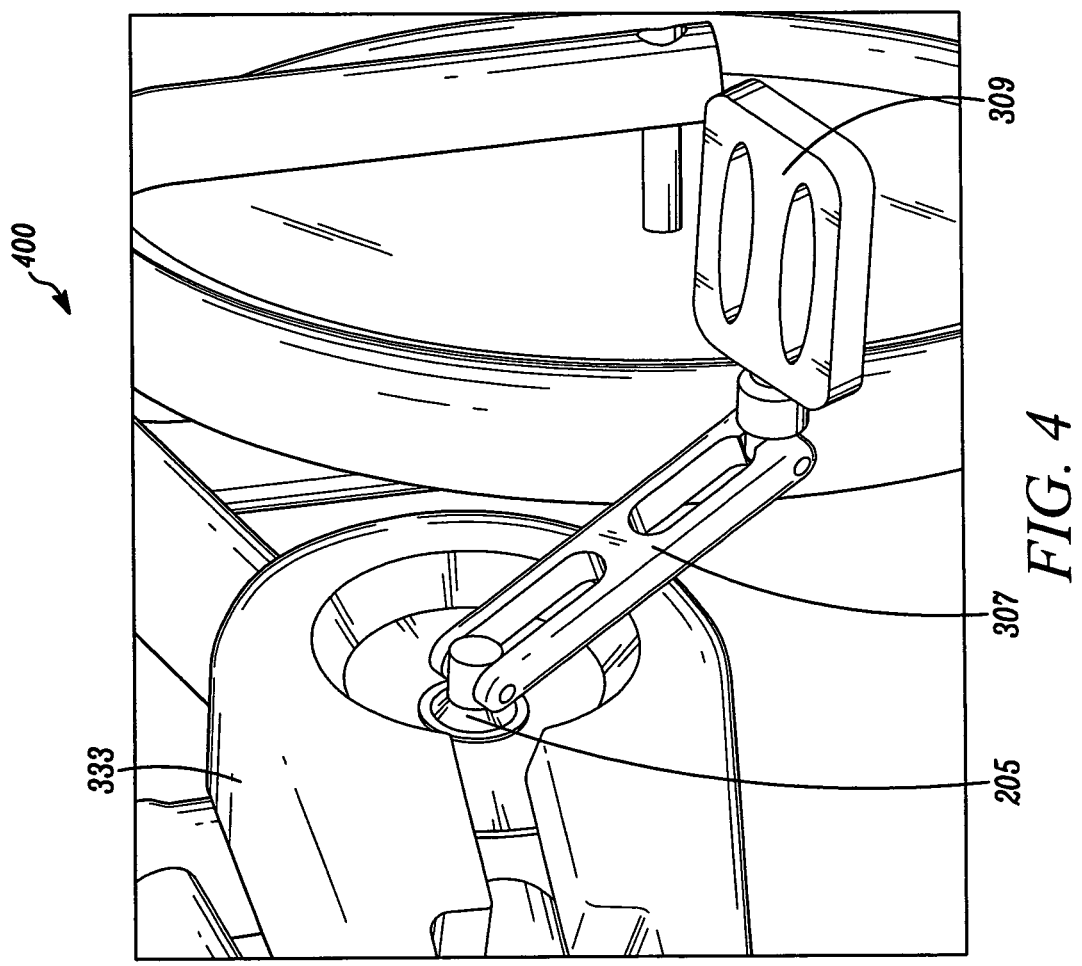
FIG. 4 illustrates an articulable crankset and a housing that does not obstruct rotation of the crankset, according to some embodiments.

In some embodiments, the housing 333 does not obstruct rotation of the crankset 305 when it's in the pedaling position. FIG. 4 illustrates a bicycle an articulable crankset and a housing that does not obstruct rotation of the crankset, according to some embodiments. The bicycle 400 has the crankset 305 in the pedaling position, and the housing 333 is designed to not obstruct movement of the crankarms 307 or the pedals 309 during rotation of the spindle 205 about its central axis in the bottom bracket assembly of the bicycle 400.

Figure 5:
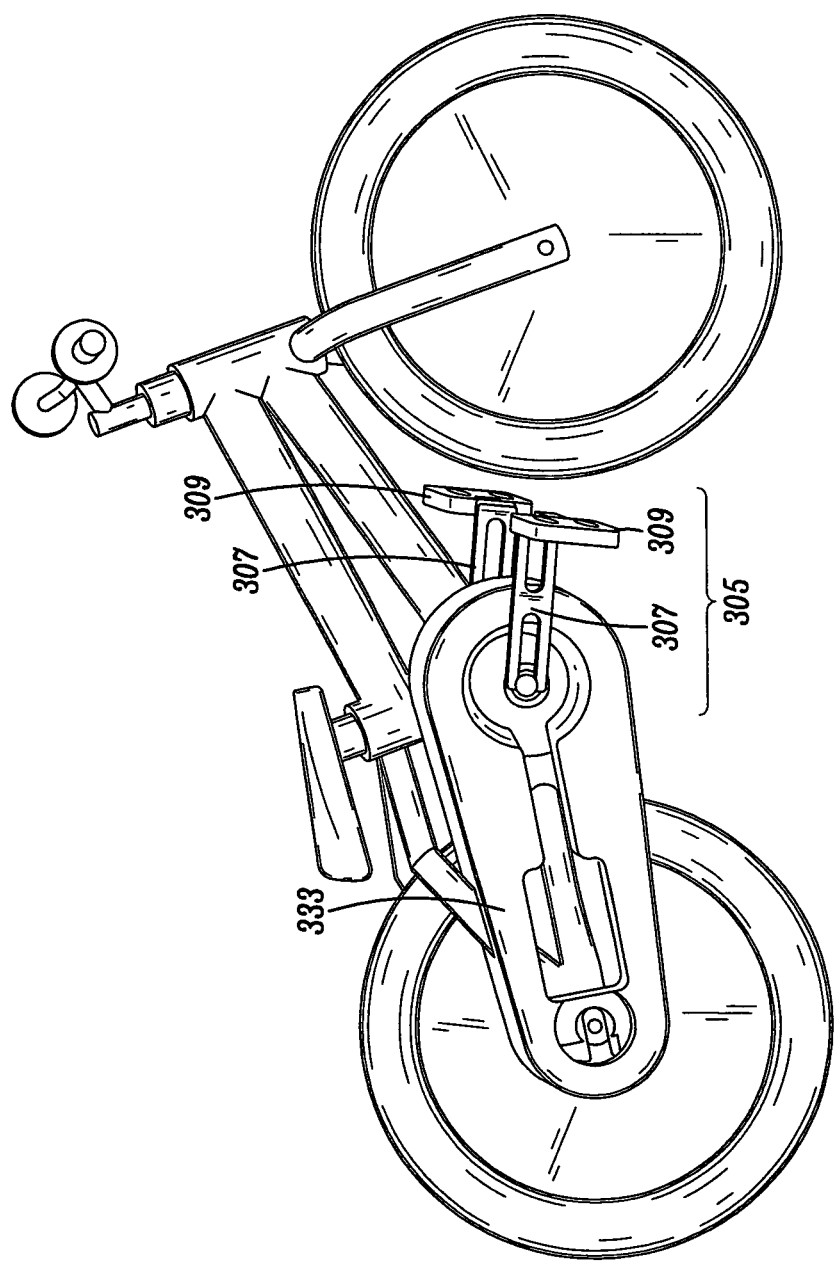
FIG. 5 illustrates a bicycle with an articulable crankset in a forward-retracted position, according to some embodiments.

In some embodiments, as in FIG. 3C, the retracted position is a backward position in which the first pedal and the second pedal are retracted toward the rear of the pedal-powered vehicle. In some embodiments, the retracted position is a forward position in which the first pedal is positioned at least substantially normal to the central axis of the first crankarm, the second pedal is positioned at least substantially normal to the central axis of the second crankarm, and the first pedal and the second pedal function as a platform for a user's feet during use of the pedal-powered vehicle. FIG. 5 illustrates a bicycle with an articulable crankset in a forward-retracted position, according to some embodiments. The bicycle 500 has crankset 305 in a forward-retracted position with the crankarms 307 in at least a substantially parallel alignment with the pedals 309 at least substantially normal to the crankarms and facing outward to enable the user to place the user's feet on the pedals 309.

The teachings are also directed to an articulable crankset for a convertible, pedal-powered vehicle, where only one of the crankarms articulates. The crankset comprises a spindle having first end, a second end, and a central axis. The first end of the spindle is attached to a spindle end of a first crankarm having a first central axis. Likewise, the second end of the spindle is attached to a spindle end of a second crankarm having a second central axis. The first central axis at least substantially shares a first plane with the central axis of the spindle, and the second central axis at least substantially shares a second plane with the central axis of the spindle. Moreover, the first plane and second plane are optionally coincident.

The first crankarm or the second crankarm articulably attaches to the spindle. And, the central axis of the first crankarm or the second crankarm articulates up to at least about 180 degrees with the central axis of the spindle at least substantially on the first plane or second plane, respectively. The first crankarm has a first pedal end adapted for attaching to a first pedal, and the second crankarm has a second pedal end adapted for attaching to a second pedal. The first pedal or the second pedal articulates at least about 90 degrees with its respective pedal end to reversibly articulate the crankset from a pedaling position to a retracted position to convert the vehicle from a pedal-powered vehicle to a push-powered vehicle. The push-powered vehicle has crankarms and pedals positioned to provide at least less of an obstruction to a user's legs during use of the push-powered vehicle than a non-retractable crankset.

In some embodiments, the retracted position is a backward position in which the first pedal and the second pedal are retracted toward the rear of the pedal-powered vehicle. And, in some embodiments, the retracted position is a forward position which the first pedal is positioned at least substantially normal to the central axis of the first crankarm, and the second pedal is positioned at least substantially normal to the central axis of the second crankarm. The first pedal and the second pedal can function as a platform for a user's feet during use of the pedal-powered vehicle.

In some embodiments, the spindle end of the first crankarm or the spindle end of the second crankarm articulably attaches to its respective spindle end through a clevis joint. And, in some embodiments, the pedal end of the first crankarm or the pedal end of the second crankarm articulably attaches to its respective pedal through a clevis joint. Moreover, in some embodiments, the pedal end of the first crankarm or the pedal end of the second crankarm articulably attaches to its respective pedal through a pedal coupling.

The teachings are also directed to a bicycle comprising a drive mechanism that includes a collapsible crankset. The collapsible crankset has a spindle connected at each end to one of two crankarms. At least one of the crankarms articulates with the spindle up to at least about 180 degrees through a reversibly fixable hinge joint, which can include any hinge joint known to one of skill, such as a clevis joint. As in any embodiment taught herein, the reversibly fixable hinge joint can be reversibly or releasably fixed using any method known in the art, such as by tightening a screw, for example, and can be reversed or released by loosening the screw, in some embodiments. Any method known to one of skill for reversibly locking a hinge joint can be used, such as sliding sleeve, a spring-loaded set of splines that mate at the joint, or any interlocking or friction mechanism that can be releasably or reversibly fastened.

In some embodiments, the crankset is a 3-piece crankset having an independent spindle that is attached to a first independent crankarm at a first end of the spindle and a second independent crankarm at a second end of the spindle. Either, or both, of the crankarms can be articulably attached to the spindle. In some embodiments, the crankset is a 2-piece crankset having a spindle/crankarm piece and an independent crankarm that is articulably attached to the spindle, such that one crankarm is fixed in position and the other crankarm is articulably attached to the spindle. The spindle/crankarm piece can be formed as a single piece, two independent pieces that have been welded together by any means known to one of skill, such as by heating or applying adhesive, or two independent pieces that are mechanically fastened using any method known to one of skill. These embodiments may be beneficial for at least the reasons that that they may have less parts and may reduce the complexity of the design and use of the articulable crankset.

The articulation of the crankarm retracts the crankset from (i) a pedaling position having the crank arms positioned at least substantially normal to the spindle in at least substantially opposing directions on opposite sides of the spindle to (ii) a collapsed position having the crank arms positioned at least substantially normal to the spindle in at least substantially the same direction on the same side of the spindle. The collapsible crankset can further comprise a collapsible pedal mechanism to further retract the crankset, wherein at least one of the pedals articulates with its respective crankarm from (i) a position that is at least substantially normal to the its respective crankarm to (ii) a position that is at least substantially parallel with the position of its respective crankarm.

In some embodiments, the collapsed position can be a backward position in which the two crankarms are retracted toward the rear of the bicycle. And, in some embodiments, the collapsed position can be a forward position which the two crankarms are retracted toward the front of the bicycle, each crankarm having a pedal in a position that is at least substantially normal to the axis of its respective crankarm, wherein the pedals function as platforms for a user's feet during use of the bicycle.

Any of the pedal-powered vehicles taught herein, such as the bicycles, can have articulable crankarms that are not only retractable but also removable. In some embodiments, the articulable cranksets have bottom bracket assemblies comprising the spindle that remain rotatably attached to a bicycle, and the crankarms and pedals are releasably or reversibly attached.

The articulable cranks and housings taught herein can be used on a variety of pedal-powered vehicles, including two-wheeled vehicles, three-wheeled vehicles, and four-wheeled vehicles. In some embodiments, the articulable cranks can be installed on new production bicycles, for example, where the crank design and housing configuration is shaped and sized for a particular bicycle frame. In some embodiments, the articulable cranks and housings taught herein can be used to facilitate an after-market conversion of a bicycle to a bicycle that can be converted from a pedal-powered bicycle to a push-powered bicycle. In some embodiments, the articulable cranks, housings, steering limiters, or a combination thereof, can be assembled and distributed as conversion kits. The conversion kits can have instructions for assembly, as well as a variety of conversion adapters 199, as shown in FIGS. 1A and 1B, which include a variety of hardware to convert a pedal-powered bicycle to a convertible bicycle that can also function as a push-powered bicycle. In some embodiments, the conversion kits can have instructions for assembly, as well as conversion adapters 199 that include hardware specific to a particular brand or brands of bicycles to convert a pedal-powered bicycle to a convertible bicycle that can also function as a push-powered bicycle.

Any of the pedal-powered vehicles taught herein, such as the bicycles, can further comprise handlebars having a rotation that is limited by a steering limiter. The steering limiter can provide an additional safety factor for training bicycles, where a centered handlebar position can be considered as "0 degrees" and a handlebar position that is about 90 degrees or greater on either side of the centered position can result in "jack-knifing" the bicycle, where the front wheel position is allowed to rotate to a position where its plane of rotation is at least substantially normal to the plane of rotation of the rear wheel, causing the user of the bicycle to fall and resulting in potential injury to the user. To reduce the risk of such a potential injury, the steering limiter limits the plane of rotation of the front wheel to substantially less than about 180 degrees, or substantially less than 90 degrees of the centered position, to avoid such complications. Steering limiters are known in the art, for example, see U.S. Pat. Nos. 4,887,827 and 6,003,890, each of which are incorporated by reference. A rotation is "substantially less than" a particular degree of rotation where the functional effects that occur from the particular degree of rotation are no longer realized. For example, in some embodiments, a rotation of about 70 degrees from the centered position of the front wheel may not create a danger of jack-knifing a bicycle, whereas a rotation of about 90 degrees will likely create the danger. As such, one of skill may be able to appreciate that a rotation of about 70 degrees may be substantially less than a rotation of 90 degrees, in some embodiments.

Figure 6A:
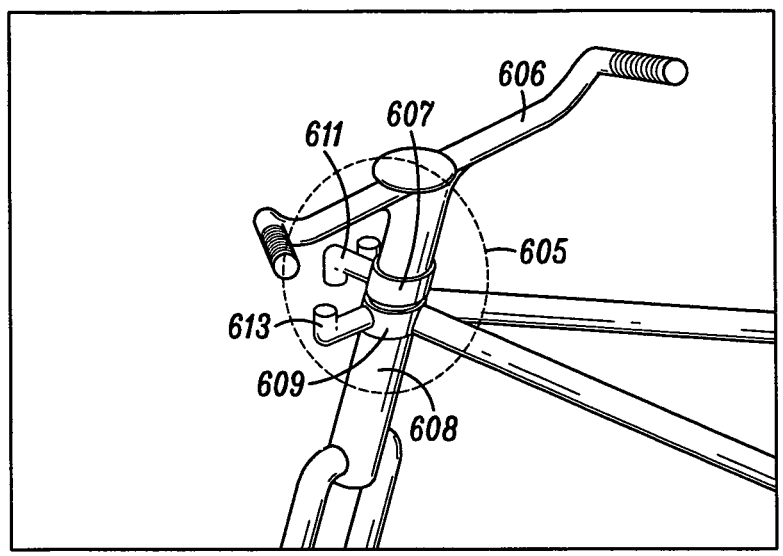
FIGS. 6A and 6B illustrate a steering mechanism having a steering limiter, according to some embodiments.
Figure 6B:
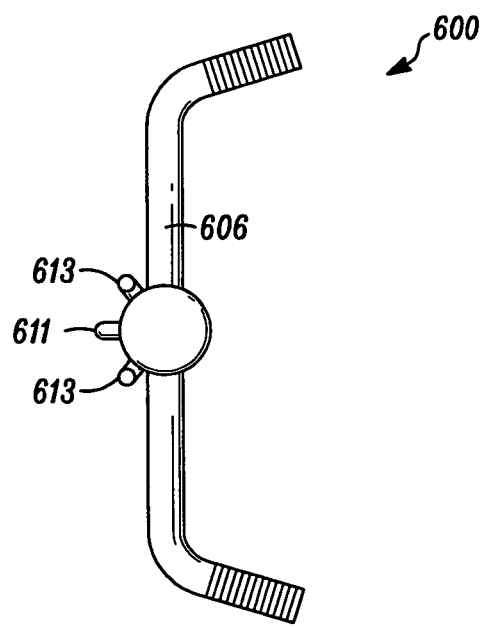

FIGS. 6A and 6B illustrate a steering mechanism having a steering limiter, according to some embodiments. FIG. 6A shows a bicycle 600 having a steering limiter 605 with an upper rotating portion 607 attached to a gooseneck/handlebar assembly 606 and a lower fixed portion 609 attached to the frame of the bicycle 608. The upper rotating portion 607 can be fixed into place such that the rotating pin 611 of the upper rotating portion 607 is centered between the two stops 613 of the lower fixed portion 609. The stops 613 can be adjusted to select a range of motion of the rotating pin 611 that is substantially less than about 180 degrees to avoid the jack-knifing problem associated with overturning of the front wheel of a bicycle. A range of motion is "substantially less" than 180 degrees can vary somewhat according to the design of the bicycle, but in any event, the definition of what is substantially less than 180 degrees is that range of motion that one of skill would consider appreciably reduces the risk of jack-knifing the bicycle substantially when compared to a range of motion that is 180 degrees, or a range of motion that allows rotation of 90 degrees from the centered handlebar position. In some embodiments, the range of motion can range from about 90 degrees to substantially less than about 180 degrees. In some embodiments, the range of motion can range from about 120 degrees to about substantially less than 180 degrees, from about 120 degrees to about substantially less than 140 degrees, from about 90 degrees to about substantially less than 140 degrees, or any range therein.

One of skill will appreciate that the concepts taught herein can extend into additional embodiments that go well-beyond a literal reading of the claims, the inventions recited by the claims, and the terms recited in the claims.

We claim:

1. A convertible, push-bicycle for a child, comprising:
   a steering mechanism operably connected to a front wheel and a frame, the frame operably connected to a rear wheel and a collapsible crankset, the collapsible crankset (i) including a spindle, two crankarms, and two collapsible pedals and (ii) configured to be convertible from a pedaling position to a backward-retracted position; and,
   a housing operably connected to the frame and having a recess configured to receive the two crankarms and the two collapsible pedals in the backward-retracted position for protecting a child's legs from the collapsible crankset in the backward-retracted position;
   wherein,
   the spindle is connected at each end to one of the two crankarms, at least one of the crankarms reversibly articulating with respect to the spindle up to at least about 180 degrees through a reversibly fixable hinge joint, the articulation of the crankarm retracting the crankset from the pedaling position to the backward-retracted position; each of the pedals articulating with its respective crankarm from (i) the pedaling position in which the pedal is at least substantially normal to its respective crankarm to (ii) the backward-retracted position in which the pedal is at least substantially parallel with the position of its respective crankarm for collapse into the housing to protect the child's legs; and,
   the crankset remains entirely intact for converting from a pedal-powered bicycle to a push-powered bicycle without requiring disassembly and re-assembly of the crankset during the process of teaching the child how to ride the convertible push-bicycle.

2. The bicycle of claim 1, wherein the collapsible crankset is adapted for configuration into a forward-retracted position in which the two crankarms are directed toward the front of the bicycle, the pedal of each crankarm having a position that is at least substantially normal to the axis of its respective crankarm and pointing outward, the pedals converted into platforms for the child's feet during the teaching.

3. The bicycle of claim 1, wherein the steering mechanism includes handlebars having a rotation that is limited by a steering limiter for the child's safety, the steering limiter limiting the rotation of the handlebars to less than 70 degrees from the centered position of the front wheel.

4. The bicycle of claim 1, wherein the reversibly fixable hinge joint comprises a clevis joint.

5. The bicycle of claim 1, comprising a means for reversibly fixing the crankset into the backward-retracted position.

6. The bicycle of claim 1, comprising a means for reversibly fixing the crankset into a forward-retracted position, the pedals converted into platforms for the child's feet during the teaching.

7. A convertible, push bicycle for a child, the bicycle comprising:
   a steering mechanism operably connected to a front wheel and a frame, the frame operably connected to a rear wheel and a collapsible crankset, the collapsible crankset (i) including a spindle, two crankarms, and two collapsible pedals and (ii) configured to be convertible from a pedaling position to a backward-retracted position or a forward-retracted position; and a means for reversibly fixing the crankset into the forward-retracted position or the backward-retracted position; and,
   a housing operably connected to the frame and having a recess configured to receive the two crankarms and the two collapsible pedals in the backward-retracted osition for protecting a child's legs from the collapsible crankset in the backward-retracted position;
   wherein,
   the spindle is connected at each end to one of the two crankarms, at least one of the crankarms reversibly articulating with respect to the spindle up to at least about 180 degrees through a reversibly fixable hinge joint; the articulation of the crankarm retracting the crankset from the pedaling position to the backward-retracted position; each of the pedals articulating with its respective crankarm from (i) the pedaling position in which the pedal is at least substantially normal to the its respective crankarm to (ii) the backward-retracted position that is at least substantially parallel with the position of its respective crankarm for collapse into the housing to protect the child's legs; and,
   the crankset remains entirely intact for converting from a pedal-powered bicycle to a push-powered bicycle without requiring disassembly and re-assembly of the crankset during the process of teaching the child how to ride the convertible push-bicycle.

8. The bicycle of claim 5, wherein the steering mechanism includes handlebars having a rotation that is limited by a steering limiter for the child's safety, the steering limiter limiting the rotation of the handlebars to less than less than 70 degrees from the centered position of the front wheel.

9. The bicycle of claim 5, wherein the reversibly fixable hinge joint comprises a clevis joint.

* * * * *